(12) United States Patent
Rutherford

(10) Patent No.: US 7,123,973 B2
(45) Date of Patent: Oct. 17, 2006

(54) PARTITIONED CONTROL SYSTEM AND METHOD

(76) Inventor: Mark L. Rutherford, 2112 Fairfax Ave., Apartment 116, Nashville, TN (US) 37212

( * ) Notice: Subject to any disclaimer, the term of this patent is extended or adjusted under 35 U.S.C. 154(b) by 0 days.

(21) Appl. No.: 11/214,700

(22) Filed: Aug. 30, 2005

(65) Prior Publication Data

US 2005/0288801 A1 Dec. 29, 2005

Related U.S. Application Data

(62) Division of application No. 10/789,221, filed on Feb. 27, 2004, now Pat. No. 6,959,218, which is a division of application No. 09/531,057, filed on Mar. 20, 2000, now Pat. No. 6,721,608.

(51) Int. Cl.
*G05B 13/02* (2006.01)
*G05B 11/01* (2006.01)

(52) U.S. Cl. ............... 700/53; 700/20; 700/28; 700/29; 700/37; 700/45; 700/54

(58) Field of Classification Search ............ 700/8, 700/20, 28–29, 37, 44–45, 53–54
See application file for complete search history.

(56) References Cited

U.S. PATENT DOCUMENTS

| | | | |
|---|---|---|---|
| 4,663,703 A | 5/1987 | Axelby et al. | |
| 4,814,968 A | 3/1989 | Fukumoto | |
| 4,842,089 A | 6/1989 | Kimbrough et al. | |
| 4,860,215 A | 8/1989 | Seraji | |
| 5,034,312 A | 7/1991 | Saito | |
| 5,043,863 A | 8/1991 | Bristol et al. | |
| 5,379,210 A * | 1/1995 | Grujic et al. | 700/28 |
| 5,394,322 A | 2/1995 | Hansen | |
| 5,455,763 A | 10/1995 | Feingold | |
| 5,481,453 A | 1/1996 | Desantis | |
| 5,561,599 A | 10/1996 | Lu | |
| 5,609,136 A * | 3/1997 | Tuken | 123/357 |
| 5,777,872 A * | 7/1998 | He | 700/29 |
| 5,791,160 A | 8/1998 | Mandler et al. | |
| 5,892,679 A * | 4/1999 | He | 700/29 |
| 5,901,059 A * | 5/1999 | Tao et al. | 700/29 |
| 6,162,488 A | 12/2000 | Gevelber et al. | |
| 6,185,468 B1 * | 2/2001 | Wells | 700/30 |
| 6,546,295 B1 | 4/2003 | Pyotsia et al. | |
| 6,658,304 B1 * | 12/2003 | Molander et al. | 700/45 |
| 6,697,767 B1 * | 2/2004 | Wang et al. | 702/189 |

OTHER PUBLICATIONS

Debelak, Kenneth A. et al., Partitioned Error Control. Ind. Eng. Chem. Res. 38: 4113-4119 (1999).

(Continued)

*Primary Examiner*—Anthony Knight
*Assistant Examiner*—Ronald D Hartman, Jr.
(74) *Attorney, Agent, or Firm*—Jones Day

(57) ABSTRACT

A method for controlling a controlled process in response to an input signal and a disturbance signal includes modeling the controlled process in a process model; controlling the process model by a first controller; isolating the first controller from the disturbance signal so that the first controller may be designed for an optimal response to the input signal; driving the first controller by a first drive signal proportional to the difference between the input signal and a process model output signal; isolating a second controller from the input signal so that the second controller may be designed for an optimal response to the disturbance signal; and driving the second controller by a second drive signal proportional to difference between a process output signal and the process model output signal.

6 Claims, 2 Drawing Sheets

OTHER PUBLICATIONS

Lundstrom, Peter et al., Two-Degree-of-Freedom Controller Design for an Ill-Conditioned Distillation Process Using u-Synthesis. IEEE Transactions on Control Systems Technology, 7: No. 1, 12-21 (1999).

Limebeer, D.J. N. et al. On the Design of Robust Two Degree of Freedom Controllers. Automatica 29: No. 1, 157-168 (1993).

van Diggelen, F. et al. A Hadamard Weighted Loop Shaping Design Procedure. Proceedings of the 31st IEEE Conference on Decision and Control. 2: 2193-2198 (1992).

Skogestad, Sigurd et al. Robust Control of Ill-Conditioned Plants: High-Purity Distillation. IEEE Transactions on Automatic Control 33 No. 12, 1092-1105 (1988).

Lopez, A.M., Tuning Controllers With Error-Integral Criteria. Instrumentation Technology 57-62 (1967).

Rovira, Alberto A., Tuning Controllers for Setpoint Changes. Instruments & Control Systems 42: 67-69 (1969).

Tyreus, Bjorn D., et al. Tuning PI Controllers for Integrator/Dead Time Processes. Ind. Eng. Chem. Res. 31: 2625-2628 (1992).

Murrill, Paul W., The Controller; The Adjustement of Controllers; Controllers and Degrees of Freedom. Automatic Control of Processes. International Textbook Company, Scranton, Pennsylvania Ch. 16, 17, 18 319-385 (1967).

Skogestad, Sigurd et al. Classical Feedback Control. Multivariable Feedback Control Analysis and Design, John Wiley & Sons Ltd., West Sussex PO19 1US, England Ch. 2 15-62 (1996).

Astrom, Karl J. et al. Disturbance Models; Design: An Overview; Adaptive Control. Computer Controlled Systems Theory and Design, Prentice-Hall, Inc., Englewood Cliffs, NJ Ch. 6, 7, 14 121-173; 343-360 (1984).

Morari, Manfred et al. Fundamentals of SISO Feedback Control. Robust Process Control, Prentice Hall, Inc., Englewood Cliffs, NJ Ch 2 11-38 (1989).

Horowitz, Isaac M. Design of Feedback Control Systems for Independent Control of Transmission and Sensitivity Functions. Synthesis of Feedback Systems, Academic Press New York and London Ch. 6 246-298 (1963).

* cited by examiner

PARTITIONED CONTROL SYSTEM AND METHOD

This is a Divisional Application of U.S. patent application Ser. No. 10/789,221, filed on Feb. 27, 2004, which matured into U.S. Pat. No. 6,959,218, which is a Divisional Application of U.S. patent application Ser. No. 09/531,057, filed on Mar. 20, 2000 and which matured into U.S. Pat. No. 6,721,608, the entire disclosures of which are incorporated herein by reference.

FIELD

The present invention relates generally to control systems, and more particularly to process control systems in a two degree of freedom system.

BACKGROUND

A process control system implements a controller to shape the response of a process to an input signal. The control system can add gain, time varying properties, frequency components, or a combination of these characteristics to the process signal. By properly choosing these characteristics, the control system can stabilize the response of the process, determine overshoot, set acceptable error bounds and satisfy other performance criteria.

A two degree of freedom controller is generally implemented in a two degree of freedom system. Such a two degree of freedom system could consist of a setpoint and a disturbance. Within this system, the controller should track the setpoint and reject any disturbances. Controllers of this type, for example, include the precompensator 10 of FIG. 1.

The precompensator 10 of FIG. 1 includes a prefilter 12 and a load controller 14. These two control elements 12 and 14 shape a process input 16 for a process 18. The prefilter 12 shapes a prefilter response 20 to an input variable 22. The load controller 14 shapes the input 16 to the process 18 based on the prefilter response 20 and a process state 30 that is feedback for the system. The process state 30 is altered by a second variable 32 and the transfer function 36 of the second variable 32.

In the configuration of the precompensator 10, the load controller 14 must shape the process input 16 based in part on the prefilter response 20. Any inaccuracies from error in the prefilter 12 are propagated through the load controller 14.

SUMMARY

A method for controlling a controlled process in response to an input signal and a disturbance signal comprises modeling the controlled process in a process model; controlling the process model by a first controller; isolating the first controller from the disturbance signal so that the first controller may be designed for an optimal response to the input signal; driving the first controller by a first drive signal proportional to the difference between the input signal and a process model output signal; isolating a second controller from the input signal so that the second controller may be designed for an optimal response to the disturbance signal; and driving the second controller by a second drive signal proportional to difference between a process output signal and the process model output signal.

DETAILED DESCRIPTION

Figure 1:
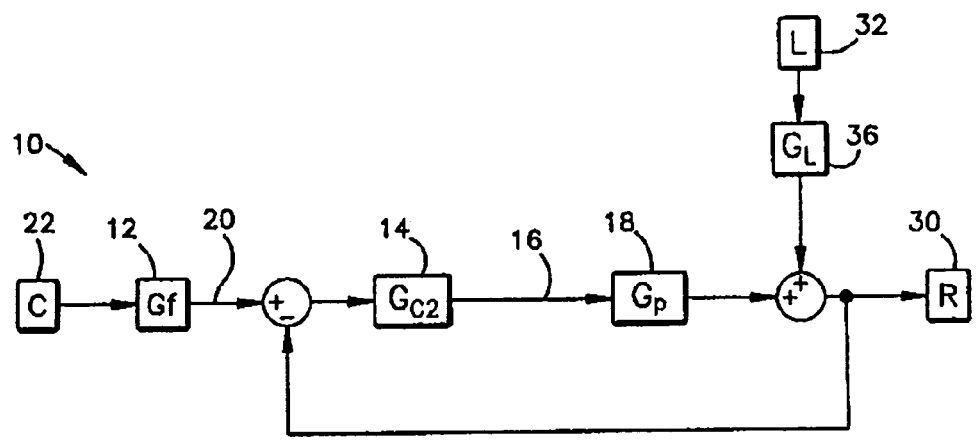
FIG. 1 is a schematic diagram of a prior art two degree of freedom control system.
Figure 2:
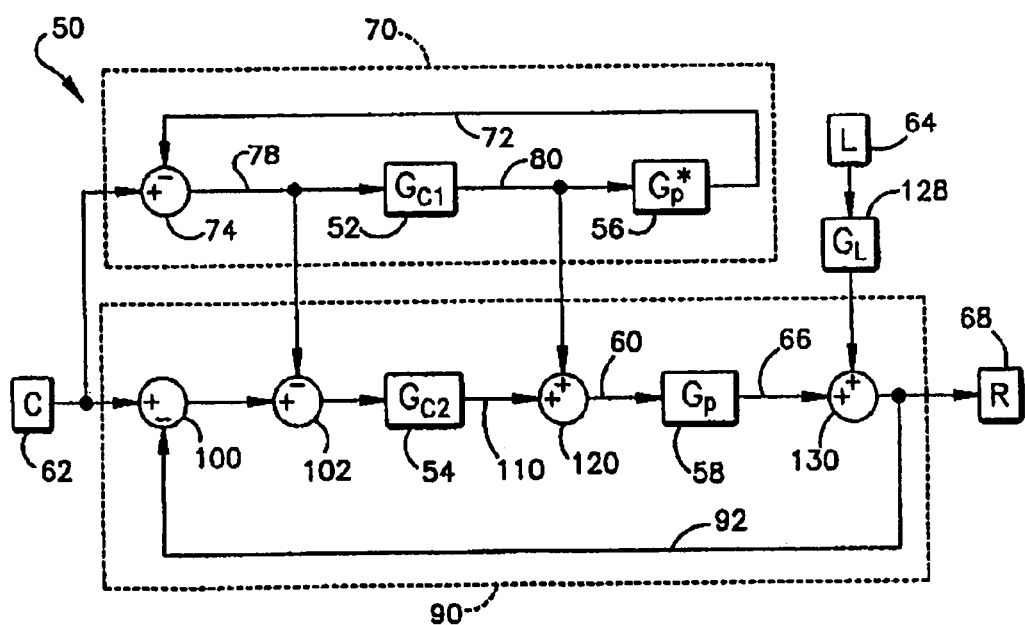
FIG. 2 is a schematic diagram of a two degree of freedom control system comprising a preferred embodiment of the present invention.

A control structure 50 comprising a preferred embodiment of the present invention is shown in FIG. 2. The control structure 50 comprises a first controller 52, a second controller 54, and a process model 56. These three components of the control structure 50 control a system process by regulating a process 58 with a process control signal 60 based on values of a first variable, C, 62 and process feedback. The process feedback is the sum of a second variable, L, 64 and a partial process output 66. The second variable 64 is an external component to the system process to affect the process output 68.

The first controller 52 and the process model 56 are located in a partitioned feedback loop 70. Within the partitioned feedback loop 70, the first controller 52 and the process model 56 are part of the forward path of the partitioned loop 70. A feedback signal 72 is a predicted process output that is fed back to the first controller 52 from the process model 56. The first variable 62 is the input of the partitioned feedback loop 70. A first difference junction 74 calculates the difference between the first variable 62 and the predicted process output 72. The output from the first difference junction 74 is a predicted error 78 of the process 58. The transfer function, $G_{C1}$, of the first controller 52 receives the predicted error 78 as an input and outputs an idealized control signal 80. The idealized control signal 80 is the input for the process model 56. The process model transfer function, $G_P^*$, takes the idealized control signal 80 as an input and generates the predicted process output 72.

The second controller 54 is located on a main loop 90 of the control structure 50. The second controller 54 is parallel to the first controller 52. The second controller 54 feeds a control signal into the process 58. A feedback signal 92 is the value of the process output 68. A second difference junction 100 calculates the difference between the first variable 62 and the measured output 92. The output from the second difference junction 100 is fed into a third difference junction 102. The third difference junction 102 calculates the difference between the output of the second difference junction 100 and the predicted error 78 from the partitioned feedback loop 70.

The transfer function $G_{C2}$, of the second controller 54 manipulates the output of the third difference junction 102 to generate a second control signal 110. A first summing junction 120 sums the second control signal 110 with the idealized control signal 80 from the partitioned feedback loop 70. The output of the first summing junction 120 is the process control signal 60 for the process 58. The partial process output 66 is the result of the transfer function, $G_P$, of the process 58 responding to the process control signal 60.

The second variable 64 acts upon the process system through a transfer function $G_L$ in a load process 126. The output of the load process 126 is a load output 128. The load output 128 is summed with the partial process output 66 by a second summing junction 130. The output of the second summing junction 130 is the process output 68. The second variable 64 thus adds a disturbance to the process output 68.

As can be seen by following the signals through the block diagram, the first variable 62 is shaped by the first controller 52 when the process model 56 matches the process 58. The difference junctions in the loops 70 and 90 isolate the second controller 54 from the first variable 62. The input to the second controller 54 then consists of the difference between the predicted process output 72 and the feedback of the process output 68. This difference is the value of the load disturbance created by the second variable 64 when the process model 56 matches the process 58.

The partitioned feedback loop 70 is isolated from the second variable 64. No signal is received in the partitioned feedback loop 70 from the main loop 90. The first controller 52 is isolated from any input from the second variable 64. Since each controller 52 and 54 is isolated from one of the variables 62 and 64, each controller can be independently designed for the desired response to a single variable.

The performance of the process model 56 can be measured by the response of the second control signal 110 to a change in the first variable 62. A change in the first variable 62 will not cause the second control signal 110 to change if the process model 56 matches the process 58. If the process model 56 does not match the process 58, the second control signal 110 will vary. The second control signal thus is a measure of fitness of the process model 56 to the process 58 and serves as an indicator to the need to adjust the process model 56 to more correctly model the process 58 as the process 58 changes.

The structure 50 can also be examined analytically by examining the closed loop transfer function. The closed loop transfer function for the control structure 50 is given by:

$$R = \left[ \frac{G_{C2}G_P}{1+G_{C2}G_P} + \frac{(G_{C1}-G_{C2})G_P}{(1+G_{C2}G_P)(1+G_{C1}G_P^*)} \right](C) + \frac{G_L}{1+G_{C2}G_P}(L)$$

From this closed loop transfer function, it can again be shown that when the process model 56 matches the process 58, or $G_P = G_P^*$, the closed loop transfer function reduces to:

$$R = \frac{G_{C1}G_P}{1+G_{C1}G_P}(C) + \frac{G_L}{1+G_{C2}G_P}(L)$$

wherein each controller 52 and 54 acts upon only one of the input variables 62 and 68. The first controller 52 shapes a response to the first variable 62 and the second controller 54 shapes a response to the second variable 64.

Since each of the controllers 52 and 54 in the control structure 50 is individually set to a variable, the control structure 50 can use high performance controllers to shape the response to the input variables 62 and 64. One such use of this control structure 50 is in a system where the variables are a set point and a load disturbance. The set point variable is a variable which is the desired value of the process output 68. A load disturbance is an unwanted input to the system that may or may not be measured but is undesirable.

The object of the control structure 50 would then be to match the set point and reject the load disturbance. The controller 52 associated with the set point variable would be tuned to adjust the process output 68 to the new value of the set point based on specific performance criteria for the system. For instance, it may be important to avoid overshoot and to have a rise time that is prescribed to be relatively fast for this set point change. The load rejection performed by the other controller 54 can be tuned to a different set of performance criteria. The transfer function of the second controller 54 can be chosen based on properties of the load and the desired performance criteria of the load rejection. For instance, overshoot is a particularly undesirable response to a disturbance in many systems. These distinct performance measures may not be attainable in a control system where both set point and load disturbances are routed through a single controller.

In the control structure 50, the controllers 52 and 54 are initially tuned for performance based on the modeled properties of the process 58 and the load process 128. The parameters of the transfer functions $G_{C1}$ and $G_{C2}$ as well as the order of these transfer functions are chosen to make the control signals 80 and 110 sum to the desired process control signal 60 to produce a desired process output 68. More robust designs for the control system would allow the transfer functions $G_{C1}$ and $G_{C2}$ of the controllers 52 and 54 to be self-tuned by techniques incorporated in controllers such as a model referenced adaptive controller or a self-tuning adaptive controller.

Figure 3:
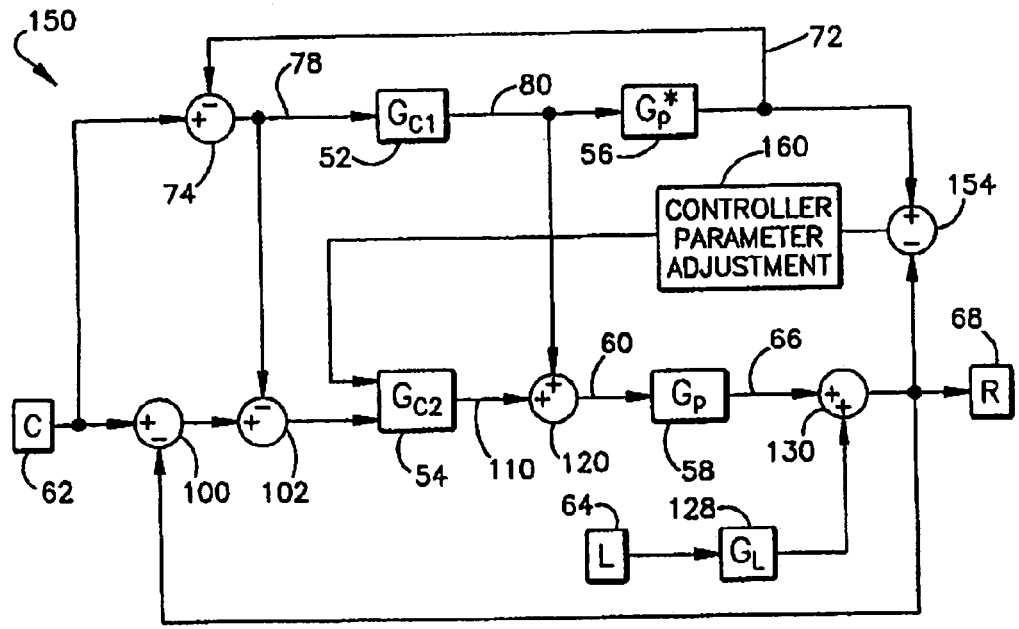
FIG. 3 is a model referenced adaptive control system that includes the preferred embodiment of the present invention.

A control structure 150 of FIG. 3 incorporates the control structure 50 in a model referenced adaptive controller. In this control structure 150, the difference between the predicted process output 72 and the process output 68 is taken in a difference junction 154. The difference junction 154 passes the difference to a parameter adjustment algorithm 160. The parameter adjustment algorithm 160 adjusts the parameters of the transfer function $G_{C2}$ of the second controller 54. The magnitude of the adjustment is based on the difference between the predicted process output 72 and the process output 68. In this control structure 150 the second controller 54 is tuned while the system is operating.

Figure 4:
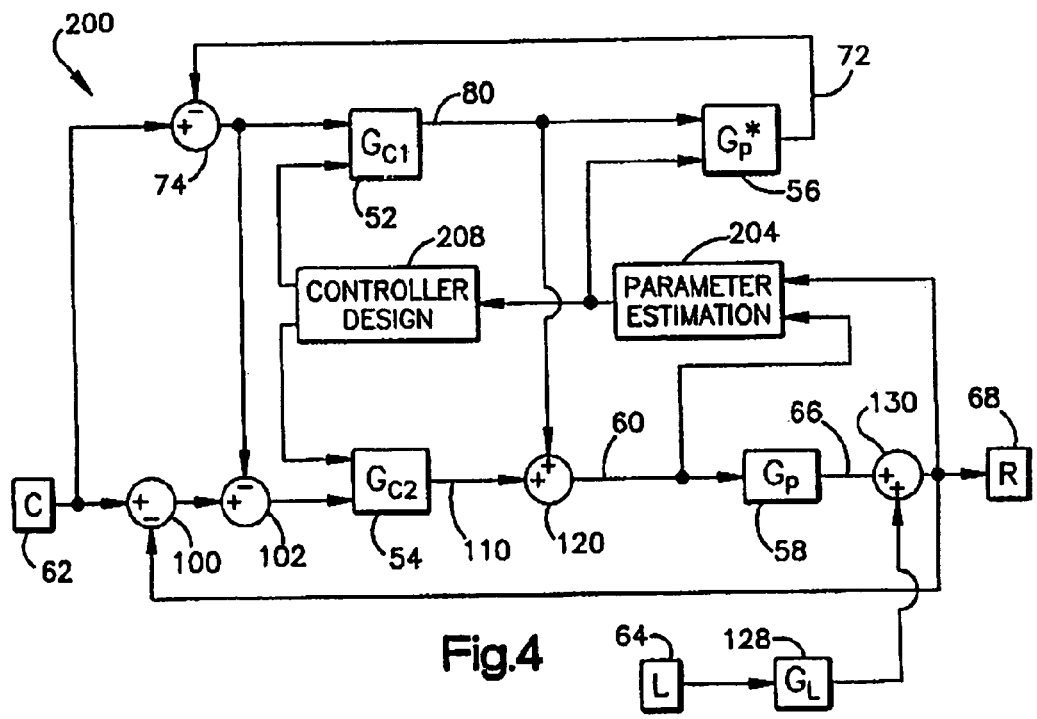
FIG. 4 is a self-tuning adaptive control system that includes the preferred embodiment of the present invention.

A control structure 200 of FIG. 4 incorporates the control structure 50 in a self-tuning adaptive controller. The control structure 200 comprises a parameter estimation block 204 and a controller design block 208. The parameter estimation 204 receives input from the measured variable 68 and the process control signal 60. The parameter estimation block 204 adjusts the parameters for the process model 56 and a set of parameters that are passed to the controller design block 208. The controller design block 208 takes the input from the parameter estimation block 204 to adjust the parameters of the transfer functions $G_{C1}$ and $G_{C2}$ of the first and second controllers 52 and 54. In this control structure 200 both controllers 52 and 54 and the process model 56 are tuned while the system is operating.

Partitioned control structure can also be implemented in a multiple input/multiple output (MIMO) system. In such a system, inputs such as the first and second variables 62 and 64 would be introduced as a vector to the control structure. The output 68 would also be a vector. Within the control structure, the transfer functions could be a matrix of functions. The process model 56 would include a model for how the process 58 would react to each input in the input vector.

The invention has been described with reference to a preferred embodiment. Those skilled in the art will perceive improvements, changes, and modifications. Such improvements, changes, and modifications are intended to be within the scope of the claims.

What is claimed is:

1. A method for controlling a controlled process in response to an input signal and a disturbance signal, the method comprising:

modeling the controlled process in a process model;

controlling the process model by a first controller;

isolating the first controller from the disturbance signal so that the first controller may be designed for an optimal response to the input signal;

driving the first controller by a first drive signal proportional to the difference between the input signal and a process model output signal;

isolating a second controller front the input signal so that the second controller may be designed for an optimal response to the disturbance signal; and driving the second controller by a second drive signal proportional to the difference between a process output signal and the process model output signal.

2. The method of claim 1, wherein isolating the first controller from the disturbance signal so that the first controller may be designed for an optimal response to the input signal comprises:

cascading the first controller and the process model in a partitioned control loop; and configuring the partitioned control loop to operate independently of feedback from the process output signal.

3. The method of claim 2, wherein driving the second controller by a signal proportional to the difference between a process output signal and the process model output signal comprises generating a signal by subtracting the first drive signal and the difference between the input signal and the process output signal.

4. The method of claim 3, wherein the process output signal comprises a signal proportional to a process output and a load disturbance.

5. The method of claim 4, further comprising;

generating an adjustment signal proportional to the difference of the process output signal and process model output signal; and adjusting the second controller by the adjustment signal.

6. The method of claim 1, wherein isolating the first controller from the disturbance signal so that the first controller may be designed for an optimal response to the input signal comprises isolating the first controller from the process output signal.

* * * * *